US008326327B2

(12) United States Patent
Hymel et al.

(10) Patent No.: US 8,326,327 B2
(45) Date of Patent: Dec. 4, 2012

(54) SYSTEM AND METHOD FOR DETERMINING ACTION SPOT LOCATIONS RELATIVE TO THE LOCATION OF A MOBILE DEVICE

(75) Inventors: James Allen Hymel, Kitchener (CA); Jean Philippe Bouchard, Waterloo (CA)

(73) Assignee: Research In Motion Limited, Waterloo (CA)

( * ) Notice: Subject to any disclaimer, the term of this patent is extended or adjusted under 35 U.S.C. 154(b) by 174 days.

(21) Appl. No.: 12/870,676

(22) Filed: Aug. 27, 2010

(65) Prior Publication Data
US 2012/0052880 A1     Mar. 1, 2012

(51) Int. Cl.
*H04W 4/02* (2009.01)
(52) U.S. Cl. .................... 455/456.3; 455/456.1
(58) Field of Classification Search .......... 455/456.1, 455/456.3, 456.6, 457, 566, 95, 550.1
See application file for complete search history.

(56) References Cited

U.S. PATENT DOCUMENTS

| 5,757,290 | A  | * | 5/1998  | Watanabe et al. ........ 340/995.14 |
| 6,853,911 | B1 | * | 2/2005  | Sakarya .................... 701/455 |
| 2005/0073443 | A1 |   | 4/2005  | Sheha et al. |
| 2008/0045138 | A1 |   | 2/2008  | Milic-Frayling et al. |
| 2008/0163057 | A1 | * | 7/2008  | Lohi et al. .................. 715/718 |
| 2009/0051785 | A1 |   | 2/2009  | Kamada et al. |
| 2009/0098888 | A1 | * | 4/2009  | Yoon ....................... 455/456.2 |
| 2009/0132941 | A1 |   | 5/2009  | Pilskalns et al. |
| 2009/0176509 | A1 |   | 7/2009  | Davis et al. |
| 2009/0189811 | A1 |   | 7/2009  | Tysowski et al. |
| 2009/0319595 | A1 |   | 12/2009 | Millmore et al. |
| 2010/0004005 | A1 | * | 1/2010  | Pereira et al. .............. 455/457 |
| 2011/0288770 | A1 | * | 11/2011 | Greasby ................... 701/208 |

FOREIGN PATENT DOCUMENTS
WO     2007036737     4/2007

OTHER PUBLICATIONS

Extended European Search Report dated May 18, 2011. In corresponding application No. 10174308.6.
Francesca, Carmagnola et al. "tag-based user modeling for social multi-device adaptive guides", User Modeling and User-Adapted Interaction, Kluwer Academic Publishers, Do, vol. 18, No. 5, Jul. 29, 2008, pp. 497-538, XP019650064, ISSN: 1573-1391. DOI: DOI: 10.1007/S11257-008-9052-2 abstract pp. 498-500* pp. 510-515.

(Continued)

*Primary Examiner* — Cong Tran
(74) *Attorney, Agent, or Firm* — Novak Druce + Quigg LLP

(57) ABSTRACT

A system and method for determining action spot locations relative to the location of a mobile device includes a display and a processor module communicatively coupled to the display. The processor module is configured to receive executable instructions to display a graphical user interface of the display; receive data indicative of the current location of the mobile device; and determine at least one action spot relative to the current location of the mobile device. The processor module can signify the action spot on the graphical user interface and provide an indication of activity level occurring at the action spot. The action spot can be a location where at least one other mobile device has engaged in documenting action within a predetermined period of time from when the mobile device arrived at the current location.

20 Claims, 10 Drawing Sheets

OTHER PUBLICATIONS

Jesper Kjeldskov, Jeni Paay: "Just-for-us: a context-aware mobile information system facilitating sociality", ACM, 2 PENN Plaza, suite 701—New York USA, Sep. 19, 2005-Sep. 22, 2005, pp. 23-30, XP040026719, Salzburg DOI: 10.1145/1085777.1085782 ISBN: 1-59593-089-2 abstract * figures 3-9* section 4.

Presselite. Twitter 360. http://www.twitter-360.com.Retrieval Nov. 29, 2010.

Association for Computing Machinery. Inferring generic activities and events from image content and bags of geo-tags; http://portal.acm.org/citation.cfm?id=1386361&dl=GUIDE&coll=GUIDE&CFID=76303014&CFTOKEN=93381868.Retrieval Nov. 29, 2010.

IEEE. Annotating collections of photos using hierarchical event and scene models. http://ieeexplore.ieee.org/Xplore/login.jsp?url=http%3A%2F%2Fieeexplore.ieee.org%2F ie15%2F4558014%2F4587335%2F04587382.pdf%3Farnumber%3D4587382&authDecis ion=203. Retrieval Nov. 29, 2010.

Bongwon Suh. Semi-automatic photo annotation strategies using event based clustering and clothing based person recognition. http://www.sciencedirect.com/science_ob=ArticleURL&_udi=B6V0D-4N68NFK-1&_user=10&_coverDate=07%2F31%2F2007&_alid=1561701294&_rdoc=1&_fmt=high&_orig=search&_origin=search&_zone=rsIt_list_item&_cdi=5644&_sort=r&_st=13&_docanchor=&view=c&_ct=1&_acct=C000050221&_version=1&_urlVersion =0&_userid=10&md5=d1fd8b6eb5d6ef3ebf18835ddc41e761&searchtype=a. Retrieval Nov. 30, 2010.

Partial European Search Report mailed Jan. 28, 2011. In corresponding application No. 10174308.6.

* cited by examiner

SYSTEM AND METHOD FOR DETERMINING ACTION SPOT LOCATIONS RELATIVE TO THE LOCATION OF A MOBILE DEVICE

FIELD OF TECHNOLOGY

The subject matter herein generally relates to mobile devices, and more specifically relates to a system and method for determining an action spot based on the location of a mobile device.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, handheld messaging devices, personal digital assistants, and handheld computers.

Mobile devices allow users to have an integrated device which can perform a variety of different tasks. For example, a mobile device can be enabled for each of or some of the following functions: voice transmission (cell phones), text transmission (pagers and PDAs), sending and receiving data for viewing of Internet websites, multi-media messages, videography and photography. Additionally, mobile devices can include one or more applications such as a map application or a navigation application for retrieving maps and directions to locations relative to the mobile device.

BRIEF DESCRIPTION OF THE DRAWINGS

Implementations of the present technology will now be described, by way of example only, with reference to the attached figures, wherein.

DETAILED DESCRIPTION

Figure 1:
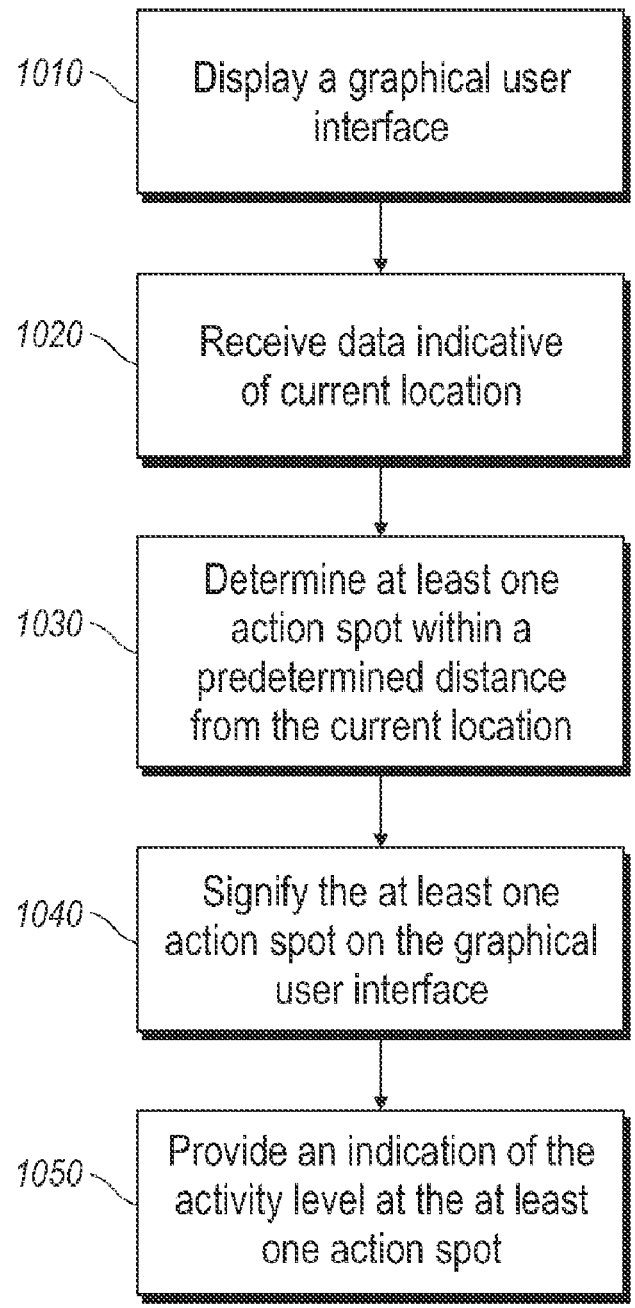
FIG. 1 is an illustrative flow chart of a method for determining a mobile device's current location and signifying and action spot, in accordance with an exemplary implementation of the present technology.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "highlight" refers to altering the appearance of a graphical item displayed on the display screen to indicate that the graphical item has been selected for execution. For example, highlighting can include changing the color of the graphical item, changing the font or appearance of the graphical item, applying a background color to the graphical item, superimposing a block of semi-transparent color over the graphical item, placing a border around the graphical item, enlarging the graphical item as compared to other graphical items proximate to the highlighted graphical item, or other similar and known methods of highlighting graphical items or text items display on a display screen. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The term "activity" refers to an action taken by a mobile device. For example, an activity can include but is not limited to a documenting action (such as a text messaging, emailing, blogging, posting a message on a social networking internet site, or any other documenting actions), a recording action (such as video recording, audio recording, or photographing taken by a mobile device) or any other action where the mobile device is being used to observe and make note of a location or an event currently occurring at the location of the mobile device. The term "action spot" refers to a location or an event where at least one activity is occurring relative to the current location of another mobile device.

When mobile devices are enabled for navigational functions, mobile devices can retrieve and display maps and directions to locations relative to the current location of the mobile device. Typically, the maps and directions are limited in information. For example, maps are limited to displaying the streets within a city. In order to find information relating to events and happenings currently occurring proximate to the mobile device's present location, the user of the mobile device will have to search an external resource, such as an electronic events calendar, internet sites, internet calendars of individual business or event holders (stores, restaurants, concert venues, bars, etc.), and compare the locations of the found events and happenings to the mobile device's current location. Such a process of manually researching events and happenings, determining the location of the events and happenings, and comparing the location of the events and happenings to the user's current location is tedious and results in user frustration. Moreover, the results of the user's research of current events and happenings can be incomplete and inaccurate, and the user can miss certain happenings that are close in proximity to the current location of the user's mobile device.

The present disclosure provides a system and method of determining action spot locations relative to the location of a mobile device. In one implementation, a mobile device includes a display and a processor module communicatively coupled to the display. The processor can be configured to receive executable instructions to: determine a current location of the mobile device; determine at least one action spot, within a predetermined distance from the current location of the mobile device; signify the at least one action spot with a graphical item on the display of the mobile device; marking the graphical item according to an activity level of the at least one action spot. The activity spot can include a location relative to the current location of the mobile device where at least one other mobile device has engaged in documenting action within a predetermined period of time.

FIG. 1 is an illustrative implementation of a flow chart of a method 1000 for determining action spots relative to the location of a mobile device. The method 1000 can be implemented on any mobile device, such as a cell phone, a smart phone, a netbook, a global position system (GPS) device, an electronic, table, an electronic pad, a personal digital assistant (PDA), or any other similar electronic device which includes a display and a processor communicatively coupled to the display. In FIG. 1, a graphical user interface can be displayed on the display of a mobile device (Block 1010). For example, the graphical user interface can be a map, an interactive map, a graphical user interface associated with an application configured to retrieve maps and directions, a graphical user interface associated with an application configured to determine action spot locations, a graphical user interface of a camera application, or any other similar graphical user interface where the location of the mobile device and action spots relative to the location of the mobile device can be displayed.

Data indicative of the current location of the mobile device is received (Block 1020) and can be displayed on the graphical user interface. In the illustrated implementation, a processor of the mobile device can receive the data indicative of the current location of the mobile device. In at least some implementations, the data indicative of the current location of the mobile device can be received from a satellite positioning system, a communications network system, a triangularization system, or any other system that allows for determining the location or position of a mobile device.

The processor can determine at least one action spot located within a predetermined distance from the current location of the mobile device (Block 1030). In at least one implementation, the at least one action spot can be determined as a location where at least one other mobile device has engaged in a documenting action within a predetermined period of time from the time the mobile device arrived at the current location of the mobile device. For example, the processor can determine the at least one action spot as the location where at least one other mobile device is composing an email, composing a text message, messaging on an instant messenger application, posting messages, pictures, or videos on a social networking site, posting on a virtual posting mechanism, or any other similar documenting action. Alternatively, the at least one action spot can be determined based on at least one other mobile device performing a recording action, such as video recording, audio recording, or photographing, within a predetermined distance from the current location of the mobile device. In another implementation, the at least one action spot can be determined by monitoring the number of data packet transmissions occurring within a particular geographical area or the number of data packets being transmitted from at least one other mobile device. In yet other implementations, the at least action spot can be the location where at least one other mobile device has documented, recorded, accounted, chronicled, or otherwise has taken note of a location or a current happening occurring at the location.

The at least one action spot is signified on the graphical user interface (Block 1040). For example, the processor can execute instructions to display the at least one action spot on the graphical user interface as a graphical item such as an icon, a picture, a text representation, a drawing, an image, a symbol, or any other graphical item that is representative of the at least one action spot. The at least one action spot can also be displayed relative to the current location of the mobile device. The processor can determine the level of activity at the at least one action spot and can provide an indication of the activity of the level at the at least one action spot on the graphical user interface (Block 1050). With a graphical indication of the action spots and activity levels associated with the action spots, a user can review information related to current happenings within the vicinity of the user's mobile device. Additionally, information relating to the popularity of and the current event occurring within the vicinity surrounding or associated with the current position of mobile devices is readily available to the mobile device without having to use an external device or a manual search engine, such as an internet search engine.

Exemplary implementations of the method 1000 for determining action spot locations relative to the location of a mobile device will be described in relation to FIGS. 2-8.

Figure 2:
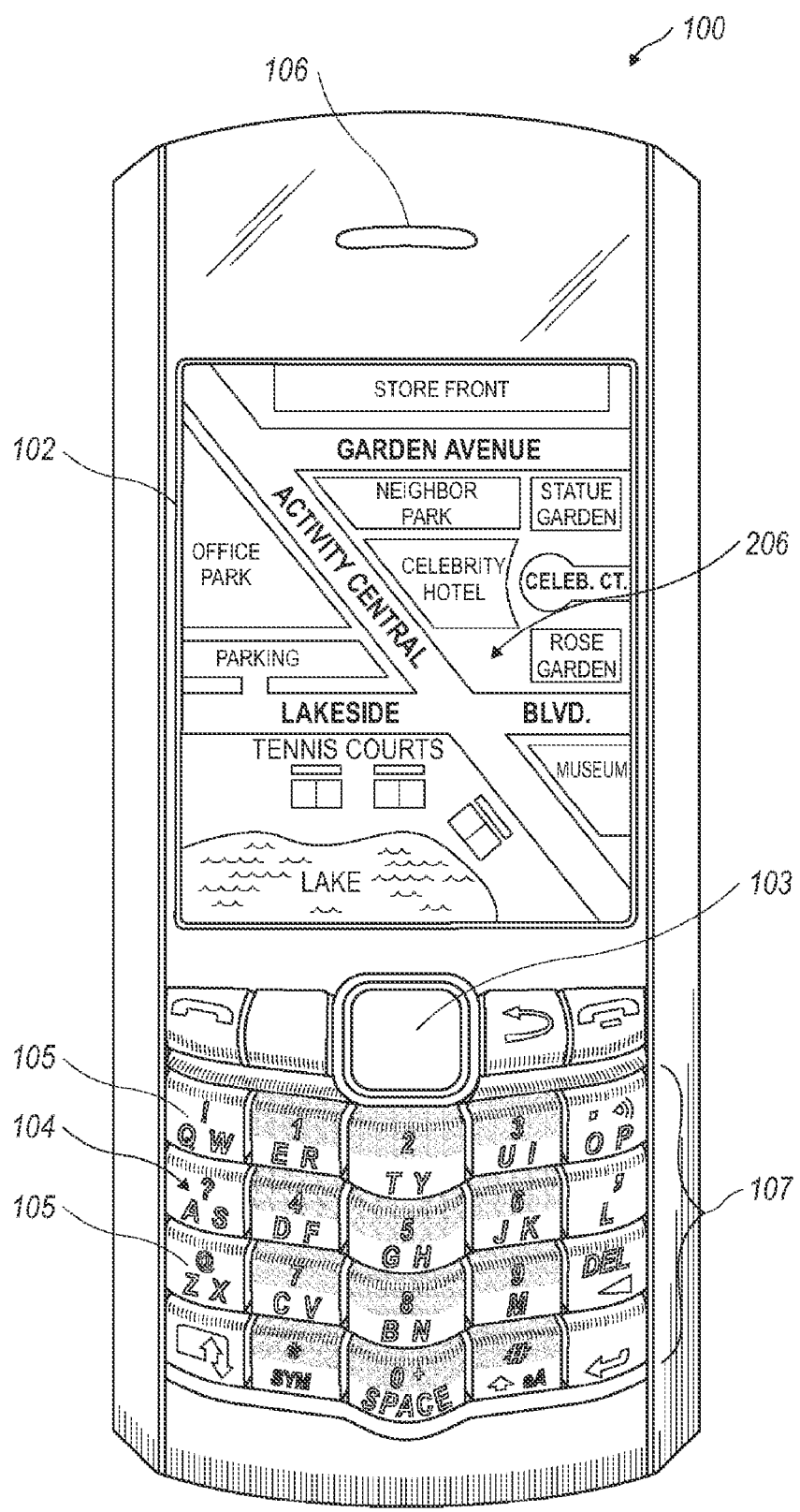
FIG. 2 is an illustrative implementation of an electronic device with a map displayed in accordance with the present technology.

FIG. 2 is exemplary implementation of the system and method of determining an action spot location implemented on a mobile device that is a mobile communication device. The mobile device 100 includes a housing which encases internal components of the device, such as a microprocessor 110 (shown in FIG. 9), a printed circuit board (not shown), and other operational components. One of ordinary skill in the art will understand that other operational components can be included in the mobile device 100, but the present disclosure will not discuss such operational components in detail for the sake of brevity. The present disclosure provides details as to the components utilized in the implementation of the system and method of determining an action spot location on a mobile device.

The mobile device 100 includes a display screen 102 for displaying graphical user-interfaces associated with applications programmed on the mobile device 100. The display screen 102 can be a liquid crystal display (LCD) screen, a light emitting diode (LED) screen, on organic light emitting diode (OLED) screen, an active-matrix organic light emitting diode (AMOLED) screen, a nanocrystal display, a nanotube display, a touch-sensitive display screen, or any display screen on which graphical or visual elements can be displayed. Above the display screen 102 is a speaker 106 for emitting sound from the mobile device 100. Below the display screen 102 is a navigation tool 103. The navigation tool 103 can be an omnidirectional pad, a jogball, a trackball, an omnidirectional joystick, a scroll wheel, an optical navigation tool, an optical trackball, or any other navigation tool. Below the navigation tool 103 is a keyboard 104 having a plurality of keys 105. In the illustrated implementation, each key 105 of the keyboard 104 bears at least one of an alphabetic, numeric, symbolic, or functional indicia. The indicia signify the data input to be input upon actuation of the key 105 bearing the indicia. In FIG. 2, the keyboard 104 is a reduced keyboard, where at least one key 105 is associated with more than one alphabetic indicia. In an alternative implementation, the keyboard 104 can be a full keyboard having each key 105 associated with an alphabetic indicia. The indicia on the keys 122 of the keyboard 104 are arranged in a QWERTY keyboard layout 107; however, one of ordinary skill in the art will appreciate that the keyboard layout 107 can be an AZERTY layout, a QWERTZ layout, a DVORAK layout, a pinyin Chinese keyboard layout, or any other keyboard layout that allows a user to input alphabetic, numeric, symbolic, and functional indicia. The keys 105 can be press-actuable keys, touch-sensitive keys, capacitive keys, or any other similar key that allows for the input of data to a processor of the mobile device upon user-engagement with the key 105.

In the illustrated implementation of FIG. 2, a graphical user interface 206 in the form of a map is displayed on the display screen 102. The map 206 can be a representation of the vicinity surrounding the current location of the mobile device 100. In at least one implementation, the map 206 can be displayed in response the selection and execution of a map application, a navigation application, an application for determining action spots, or any other similar application that provides directions, maps, and information relating to geographical locations on the mobile device 100. In an alternative implementation, a graphical user interface such as a dialogue box can be displayed in response to the launching of an application for determining action spots. In another implementation, an interactive map can be displayed allowing the user of the mobile device 100 to select graphical items, manipulate the map, or otherwise alter the map displayed on the mobile device 100.

Figure 3:
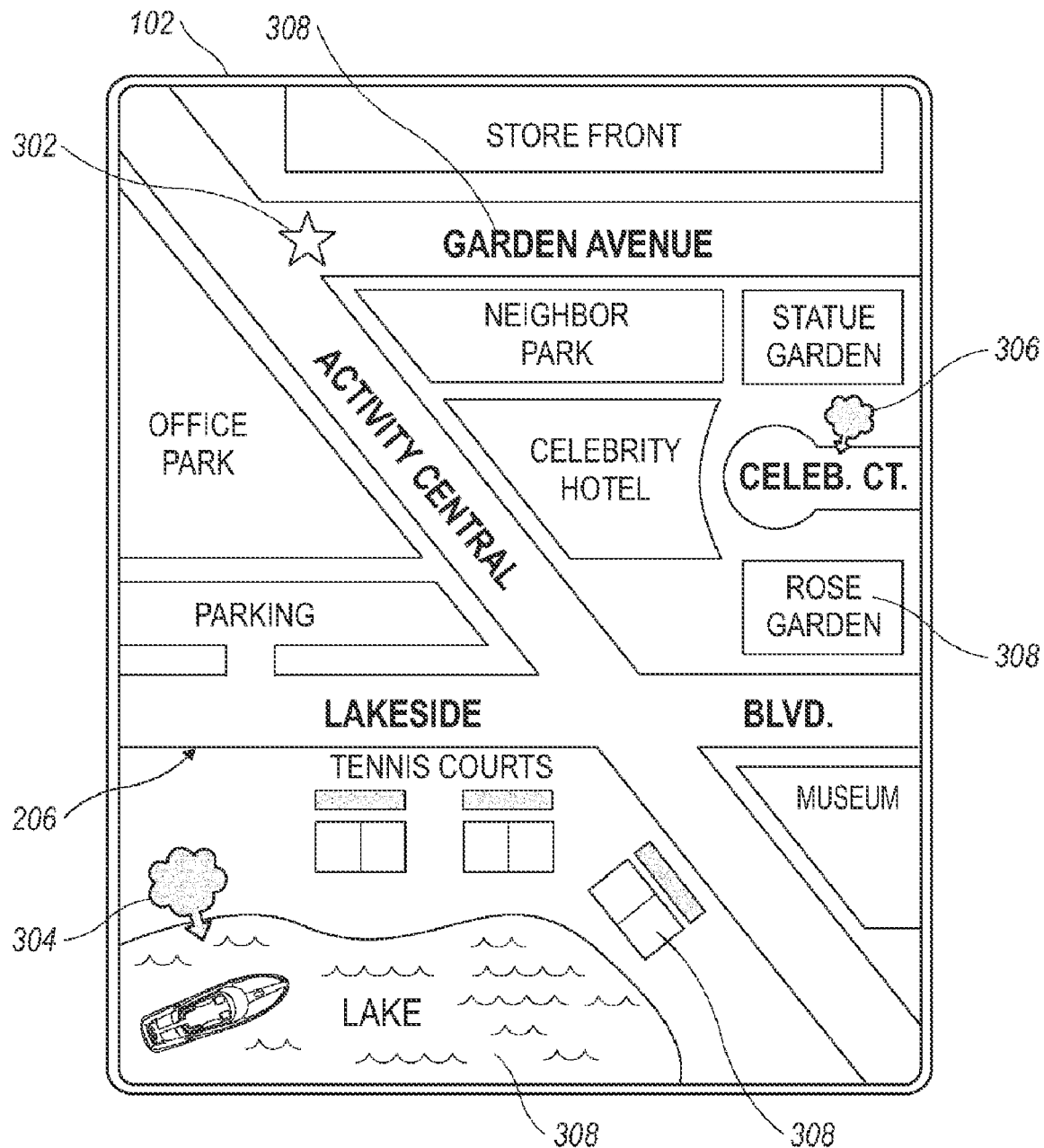
FIG. 3 is an illustrative implementation of a graphical user interface displaying an action spot within a predetermined distance from a current location of a mobile device shown in FIG. 2.

FIG. 3 an exemplary implementation of a graphical user interface associated with a system for determining an action spot relative to the location of a mobile device. More specifically, FIG. 3 illustrates a screenshot of a graphical user interface 206 displayed on the display 102 of a mobile device 100 that is an interactive map. In the illustrated implementation, the map 206 can be displayed after an application configured to determine action spots has been selected and launched. The map 206 can include graphical representations 308 of venues, locations, monuments, buildings, streets, lakes, and other locational landmarks representing the vicinity and area surrounding the current location of the mobile device 100.

Upon selection and execution of an application to display the map 206, a processor 110 (shown in FIG. 9) can execute instructions to determine the current location of the mobile device 100 by retrieving positional data at a position module 101 (shown in FIG. 9) communicatively coupled to the processor 110. The position module 101 can gather the positional data from a GPS system, a triangularization system, a communications network system, or any other system that can determine the position of a mobile device. The current location 302 of the mobile device 100 is identified on the map 206 by a graphical item. In FIG. 3, the current location 302 of the mobile device 100 is identified by a graphical item that is a star. In alternative implementations, the current location 302 can be a graphical item that is a circle, a square, or any other shape, an human-shaped icon, a text representation, a picture or photo, or any other graphical or textual item that signifies the current location 302 of the mobile device 100.

The processor 110 can determine whether there are action spots 304, 306 relative to the current location 302 of the mobile device 100 and signify the action spots 304, 306 on the map 206. In the illustrated implementation, the processor 110 identifies two action spots with a predetermined distance from the current location 302 of the mobile device 100. The action spots 304, 306 are signified on the map 206 by graphical items that are clouds. However, one of ordinary skill in the art will appreciate that the graphical items can be any other shape, a picture, any graphical item, a textual representation, a symbolic representation, or any other graphical representation that signifies the presence of an action spot within a predetermined distance from the current location 302 of the mobile device 100.

Also illustrated in FIG. 3, the action spots 304, 306 can have different sizes to indicate the level of activity associated with the action spot 304, 306. For example, the larger in size the graphical item is compared to other graphical items representing action spots, the more activity is occurring at the location identified by the graphical item. In the specific implementation in FIG. 3, the graphical item associated with action spot 304 proximate to the lake is larger than the graphical item associated with action spot 306 proximate to the venue entitled Celebrity Court. The larger graphical item associated with action spot 304 can indicate that more documenting activity has occurred at the lake than at the Celebrity Court, and thus, the action spot 304 is a more active, a more popular, or a more lively location than action spot 306. The level of activity associated with the action spot 304, 306 can also be represented by varying the colors of the graphical items representing the action spots 304, 306. For example, a graphical item that is yellow can represent a moderate amount of documenting action; while a graphical item of green represents a large amount of documenting action, and thus an increased likelihood that the action spot associated with a green graphical item is a more happening location, a more popular location, or a location where a large number of people have gathered to witness and document a current event or happening. In other words, the indication of the level of activity includes coloring the graphical item in accordance with a range of activity occurring at the at least one action spot, 304, 306.

Figure 10:
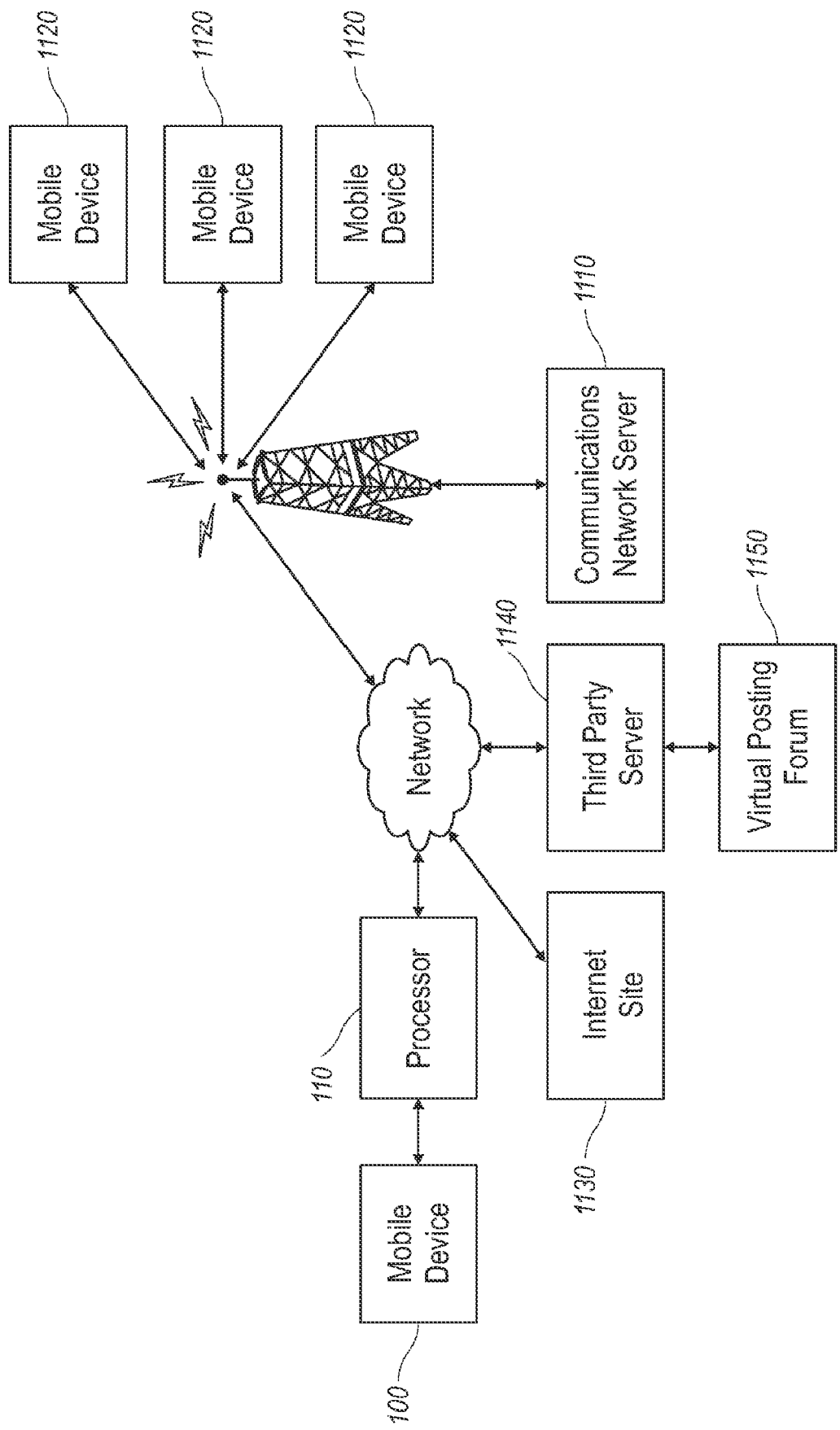
FIG. 10 is a block diagram representing the interaction between a plurality of resources, a mobile device, and a processor configured to determine action spots relative to the location of the mobile device in accordance with an exemplary implementation of the present technology.

The implementation of the present technology illustrated in FIG. 3 illustrates the results of the processor's 110 determination of action spots 304, 306, where the action spots 304, 306 based on locations where at least one other mobile device has engaged in documenting action within a specific period of time. Reference will now be made with respect to FIG. 10 in regards to the processor's 110 determination of the action spots 304, 306. FIG. 10 is a block diagram of the processor's 110 interaction and communication with the mobile device 100 and a plurality of resources from which the process 110 can retrieve data representative of documenting actions occurring within a predetermined distance from the mobile device 100. In at least one implementation, the processor 110 can retrieve the data from a resource 1110, 1130, 1140 configured to monitor the documenting actions of mobile devices within a predefined geographical location. For example, the resource can be an external server 1110 of the communications network provider of the mobile device 100. The external server 1110 can monitor the documenting actions of other mobile devices 1120 on the same communications network provider as the mobile device 100 and transmit data to the mobile device 100 indicative of action spots located within a predetermined distance from the current location 302 of the mobile device 100. For example, the server 1110 can monitor and log where other mobile devices 1120 are capturing images, capturing videos, or transmitting messages, such as text messages, instant messages, virtual posts, or any combination thereof, and identify the locations as action spots. The server 1110 can also monitor the number of images, videos, messages, and posts being captured or transmitted at various locations to determine the level of documenting activity occurring at the various actions spots based on at least one of the aforementioned monitored activities. In at least one implementation, the processor 110 can transmit the current location 302 of the mobile device 100 to the server 1110, and a second processor (not shown) coupled to the server 1110 can determine which action spots are proximate to or in the same vicinity as the current location 302 of the mobile device 100. The server 1110 can also transmit the action spot locations and levels of activity of the processor 110 of the mobile device 100 for display on the graphical user interface of the mobile device 100.

In at least another implementation, the external server 1110 can monitor the transmission of data packets by other mobile devices 1120 within a predetermined distance from the mobile device 100. The locations of where the data packet transmissions originate can indicate an action spot. The amount a data packet transmissions can identify the level of activity associated the action spot. For example, the more number of data packet transmissions originating at a particular location, the more activity is associated with the action spot, as the number of data packet transmissions can signify the number of other mobile devices 1120 transmitting data packets that are representative of documenting actions at a particular location. Alternatively, the larger the size of the data packet transmissions originating at an action spot, the higher the level of activity associated with the action spot, as large sizes of data packet transmissions can signify the type of documenting activity occurring at the action spot (for example, posting or emailing a video recording and posting or emailing a photo).

In an alternative implementation, the resource can be an internet site 1130. The internet site 1130 can monitor and log documenting activity occurring in geographical locations. The processor 110 of the mobile device 100 can request data from the internet site 1130 relating to the locations of documenting actions occurring relative to the current location 302 of the mobile device 100 as well as the amount of activity or amount of documenting actions associated with the retrieved actions.

In another alternative implementation, the resource can be a third-party server 1140 configured to monitor and log postings such as internet postings and social network postings, posted on virtual posting mechanisms 1150. Virtual posting mechanisms 1150 can also include postings on Facebook, Twitter, YouTube, an internet blogs, local newspaper message boards, local news station message boards, or any other virtual posting forum where current events and happenings can be posted. The third-party server 1140 can monitor and log the location of where such internet postings and social network postings originate and the amount of postings to determine. The processor 110 can transmit the current location 302 of the mobile device 100 to the third-party server 1140 and request data from the third-party server 1140 that is indicative of action spots relative to the current location 302 of the mobile device 100. For example, the third-party server 1140 can determine that a location within a predetermined distance from the current location 302 of the mobile device 100 is an action spot based on the number of message board posting and video postings occurring at the location within a predetermined distance from the current location 302 of the mobile device 100.

Returning to the illustrated implementation of FIG. 3, although not shown, in at least one implementation, options relating to the determination and display of action spots can be configured by the user of the mobile device 100. For example, a user can configure options via a dialog box or a setup screen. A few examples of options are presented, but other can be included. In one implementation, the user of the mobile device 100 can manually set or define the predetermined distance from the current location 302 of the mobile device 100 from which to determine the presence of an action spot relative to the mobile device 100. In at least one implementation, the predetermined distance can be predefined by a software application developer, the server provider, the manufacturer of the mobile device 100, or the communication network service provider. The predetermined distance can be within five blocks, ten blocks, ten yards, one hundred yard, one hundred feet, thirty feet, ten meters, fifteen meters, five miles, ten miles, twelve miles, twenty miles, or any other distance from the current location 302 of the mobile device 100. In another implementation, the user can also manually set or define the predetermined period of time from which to determine the presence of an action spot relative to the current location 302 of the mobile device 100. In at least one implementation the predetermined period of time can be preset by a software application developer, the server provider, the manufacturer of the mobile device 100, or the communication network service provider. The period of time can be within the last hour, the last twelve hours, the last twenty-four hours, the last thirty minutes, or any other time period that is measured from the time the mobile device 100 arrived at the current location 302.

Figure 4:
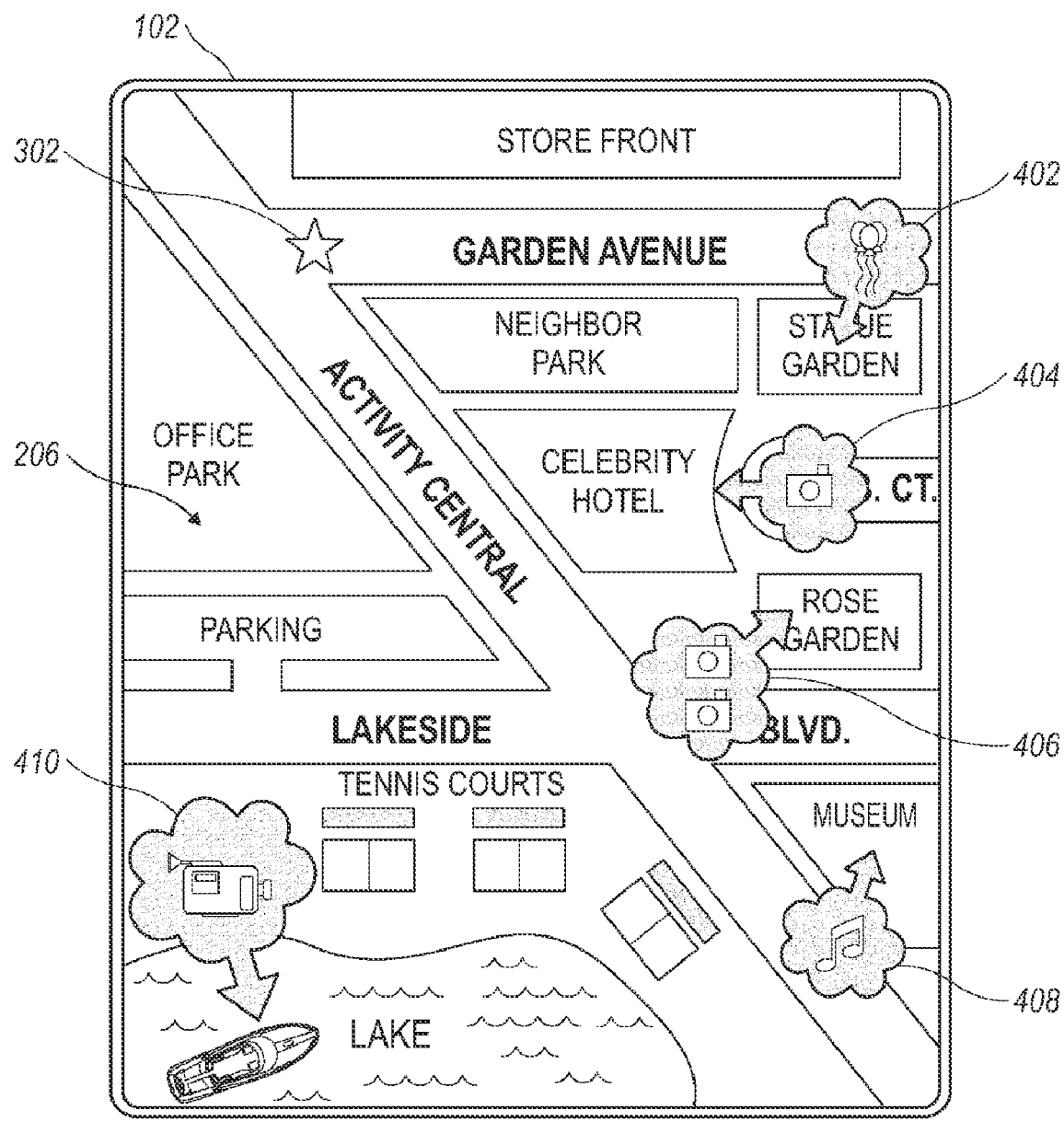
FIG. 4 is an illustrative implementation of a display of a mobile device signifying a plurality of action spots present within the vicinity of the current location of the mobile device, in accordance with the present technology.

FIG. 4 is screenshot of an alternative implementation of a system and method for determining action spots relative to a mobile device. The screenshot illustrated in FIG. 4 is similar to the screenshot in FIG. 3 in that FIG. 4 is a graphical user interface that is a map 206 displayed on the display screen of a mobile device 100. The map 206 also displays the current location 302 of the mobile device 100. FIG. 4 differs from FIG. 3 in that more action spots 402, 404, 406, 408, 410 are signified on the map 206, and the graphical items representing the action spots 402, 404, 406, 408, 410 include additional information relative to the action spots. In FIG. 4, the action spots 402, 404, 406, 408, 410 include activity icons indicative of the type of activity occurring at the action spots 402, 404, 406, 408, 410.

For example, the activity icon associated with action item 402 is balloons, which can be indicative of a party occurring at the action spot 402. That a party is taking place at the action spot 402 can be determined by a processor 110 of the mobile device 100 or by a third-party server that receives data from postings, electronic calendar events, message board forums, or any other source in which at least a portion of the subject or text body includes a recitation that the location of a party is the location associated with action spot 402.

The activity icon associated with action spots 404 and 406 is a camera, which can indicate that at least one other mobile device is capturing photographs at the locations associated with action spots 404 and 406. In the implementation illustrated in FIG. 4, the activity icon of action spot 406 includes two cameras, while the activity icon of action spot 404 includes one camera. The multiple camera activity icon associated with action spot 406 can indicate that more mobile devices are capturing photographs at action spot 406 than at action spot 404. Alternatively, the two camera activity icon associated with action spot 406 can be shown if more than a predetermined number of mobile devices are capturing photographs, for example five. The single camera activity icon associated with action spot 404 can indicate that at least one but less than the predetermined number of mobile devices are capturing photographs. Additionally, a three camera activity icon (not shown) can indicate more than a second predetermined number of mobile devices are capturing photographs, for example ten. Additionally, the camera activity icon can vary between other camera activity icons to indicate a different in the level of camera documenting activity occurring in the vicinity of the current location 302 of the mobile device 100. In at least one implementation, the coloration can be in addition to the additional graphical indications (for example, the activity icon), while in other implementations, the coloration can be instead of the other graphical indications.

The activity icon associated with action spots 408 is a musical note, which can indicate a musical event, such as a musical or a concert, is occurring at action spot 408. The determination that a musical event is occurring at action spot 408 can result from a remote server or monitoring the types of documenting action taken by other mobile device located at action spot 408. For example, the remote server can monitor postings, electronic calendar events, message board forums, or any other source in which at least a portion of the subject or text body of the posting includes a recitation that the location of a concert or musical event is associated with the location having the same location as that of action spot 408. Alternatively, the processor 110 of the mobile device 100 can monitor the postings, messages, and calendar events.

The activity icon associated with action spot 410 is a video camera, which can indicate that at least one other mobile device is capturing video at the location associated with action spot 410. Alternatively, the activity icon can indicate that at least one other mobile device is posting a video recording to a social networking site, a video posting site, or any other virtual posting forum where videos can be posted. In the implementation illustrate in FIG. 4, the graphical item (for example, the cloud) associated with action spot 410 is larger than the graphical items associated with action spots 402, 404, 406, and 408. The larger size of the graphical item associated with action spot 410 can indicate that the level of video camera activity occurring at action spot 410 is higher than the level of activity occurring at action spots 402, 404, 406, and 408. The level of activity can be determined by the size of the data packets associated with transmitting or posting the video recording, the length of the video recording, the number mobile devices capturing video, the number of video recordings being posted on a virtual posting forum, or any other calculation or method of determining the level of video recording activity.

Although not illustrated in FIG. 4, an activity icon that is a messaging icon representing messaging-type documenting activity can also be implemented. A few examples of messaging icons are presented here, but others can be considered. For example, the messaging icon can be an envelope indicating at least one other mobile device is composing and transmitting emails at the action spot. The messaging icon can be also be a computer keyboard indicating that at least one other mobile device is composing a text message or an instant message at the action spot.

In at least one implementation, the graphical items associated with the action spots 402, 404, 406, 408, 410 can include a color, a cloud size or shape size, and activity icons to distinguish the levels of activity occurring at each action spot 402, 404, 406, 408, 410. For example, the graphical item associated with the action spot 410 can have a green color to indicate that the most activity is occurring at that action spot 410. The graphical item associated with the action spot 406 can be orange to indicate that the action spot 406 has the second most activity. The graphical item associated with the actions items 404 and 402 can be yellow to indicate that the activity level of action items 404 and 402 is less than that at the action spot 406. Lastly, the graphical item associated with action spot 408 can be gray to indicate that the action spot 408 has the least amount of activity occurring at the action spot 408, as compared to the other action spots 402, 404, 406, 410. One of ordinary skill in the art will understand that at least one of a color scheme, graphical-item-sizing scheme, activity icon scheme, or a combination of at least two of a color scheme, graphical-item-sizing scheme, and activity icon scheme can be associated with a range of activity levels. The color scheme, graphical-item-sizing scheme, activity, icon scheme, or combination of at least two of a color scheme, graphical-item-sizing scheme, and activity icon scheme can then be implemented to distinguish the activity levels occurring at the action spots 402, 404, 406, 408, 410 that are within the predetermined distance of the current location 302 of the mobile device 100. The color scheme, graphical-item-sizing scheme, and activity icon scheme can be associated with a range of activity levels.

Figure 5:
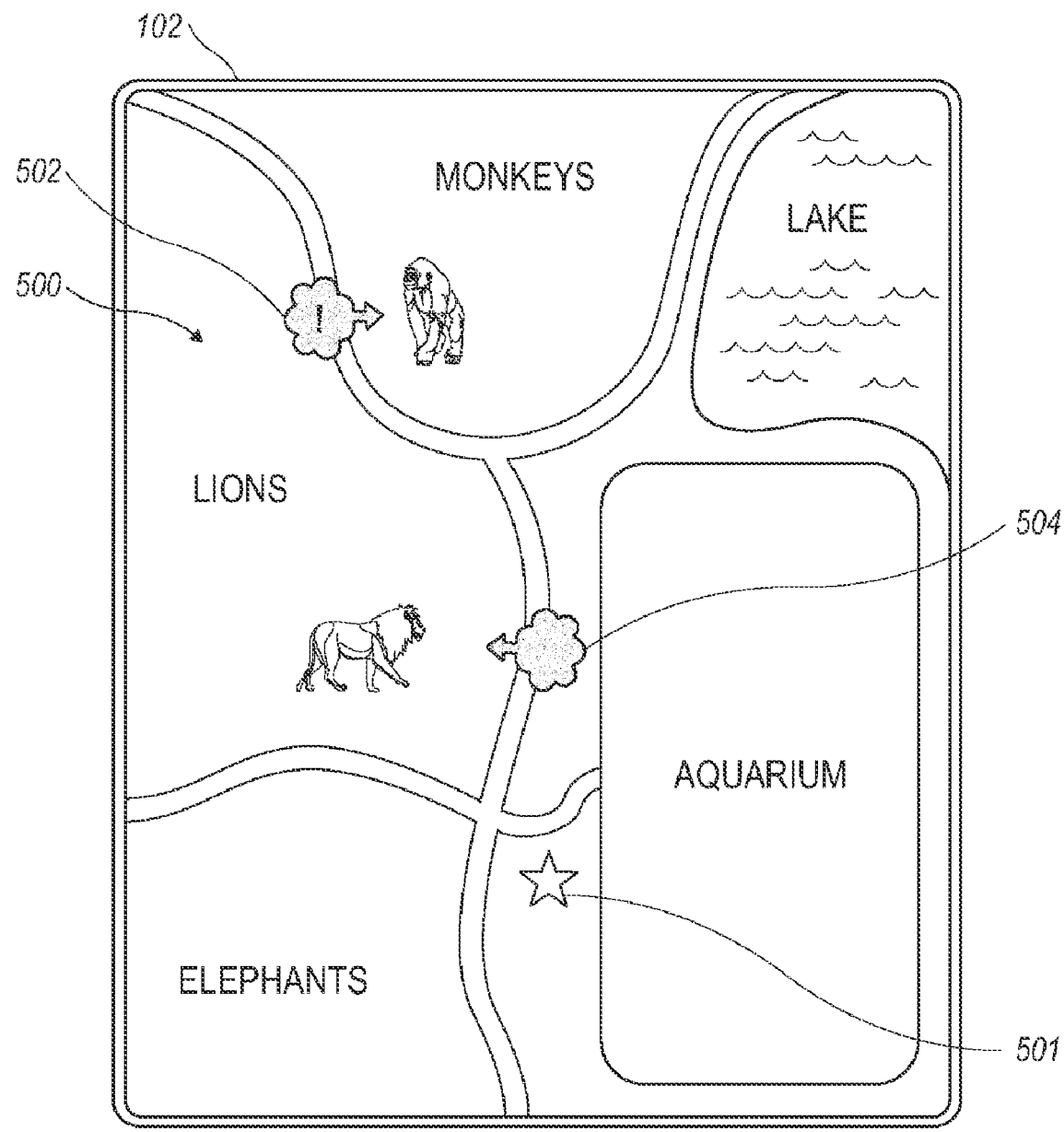
FIG. 5 is an illustrative implementation of a graphical user interface of a mobile device displaying a venue-specific map and action spots in accordance with the present technology.

FIG. 5 is a screenshot of an alternative implementation for determining action spots relative to the location of a mobile device 100. The implementation illustrated in FIG. 5 is similar to that illustrated in FIGS. 3 and 4 in that the screenshot is displayed on the display 102 of a mobile device 100 and the current location 501 of the mobile device 100 is displayed as a graphical item that is a star. FIG. 5 differs from FIGS. 3 and 4 in that the map 500 depicted on the display 102 is specific to a particular venue (for example, a zoo) rather than a map of a city or a neighborhood. In FIG. 5, the processor 110 (shown in FIG. 9) of the mobile device 100 has determined that the current location 501 of the mobile device 100 and determined that the current location 501 of the mobile device 100 is associated with a particular venue. The processor 110 can retrieve a venue-specific map directly from the venue or other remote source, thereby providing the user of the mobile device 100 with the most relevant and appropriate map associated the mobile device's 100 current location 501. For example, the processor 110 can retrieve the map from the zoo's internet site. That the map 500 is retrieved directly from the venue provides the user of the mobile device with the most relevant and accurate map of the current location 501 of the mobile device 100. Additionally, the map 501 can include more details as to the current location 501 of the mobile device 100, such as including identifications of exhibits, stores, restaurants, and other landmarks located within the venue associated with the current location 501 of the mobile device 100.

In the illustrated implementation, two action spots 502, 504 have been determined within a predetermined distance from the current location 501 of the mobile device 100. The action spots 502, 504 are signified on the map 500 by a graphical item that is a cloud. However, one of ordinary skill in the art will appreciate that the actions spots 502, 504 can be signified on the map 500 by any other symbol, shape, graphic, icon, pictorial representation, text representation, symbol representation, or any other graphical representation. In FIG.

5, the graphical item associated with the action spot 502 includes an identifier icon that is an exclamation point, while the graphical item associated with the action spot 504 does not include an identifier. The identifier icon of the action spot 502 can indicate that the activity level occurring at the location of action spot 502 is higher than the activity level occurring at the action spot 504. In another implementation, the identifier of the action spot 502 can indicate that the most recent documenting actions are occurring at action spot 502, thereby notifying the user of the mobile device 100 that the most current happening is occurring at action spot 502. For example, the identifier icon of the action spot 502 can be an indication that an exhibit show, such as a zookeeper talk or a photo opportunity, is currently taking place at action spot 502. Although the identifier icon is an exclamation point, one of ordinary skill in the art will understand that the identifier icon can be a change in color, a change in shape, a text representation, or any other graphical representation that is indicative of the activity level associated with the action spot 502, 504 or indicative of the recency of documenting actions occurring at action spots 502, 504 relative to the current location 501 of the mobile device 100.

While the implementation illustrated in FIG. 5 is a venue-specific map 500 of a zoo, one of ordinary skill in the art will appreciate that the venue-specific map 500 can be of a museum, an amusement park, a national park, a hiking trail, a landmark, a tourist attraction, a building offering tours of the building, or any other venue which has maps specific to the layout of the venue.

Figure 6:
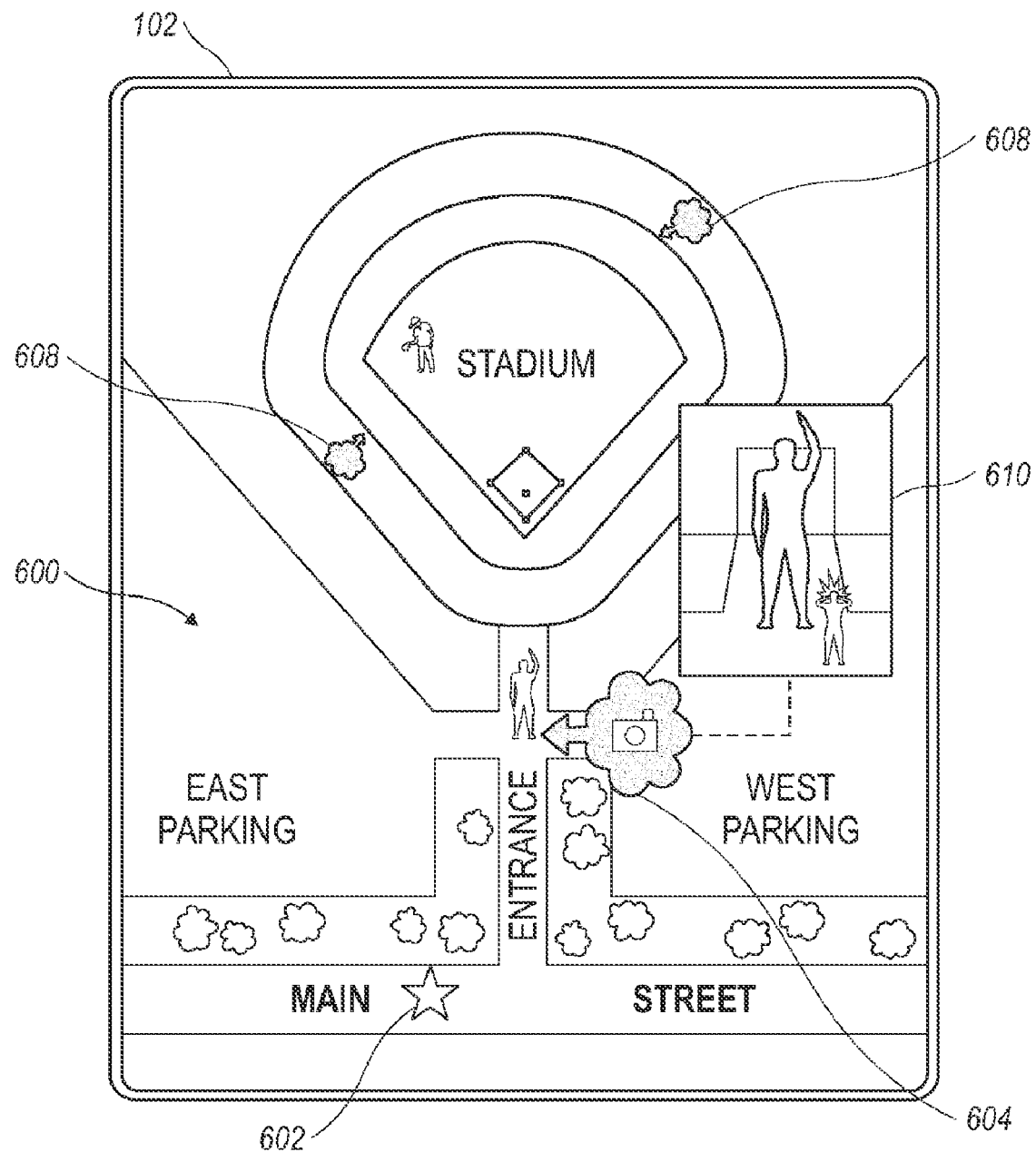
FIG. 6 is an illustrative implementation of a graphical user interface of a mobile device displaying the documenting action associated with an action spot within a predetermined distance from the current location of the mobile device.

FIG. 6 is another alternative implementation of determining action spots relative to the location of a mobile device. FIG. 6 illustrates a display 102 of a mobile device 100 having a current location 602 associated with a venue that is a baseball stadium. The displayed map 600 is a zoomed-in map focused on the venue associated with the current location 602 of the mobile device 100. FIG. 6 is similar to the maps 206, 500 illustrated in FIGS. 3-5 in that the map of FIG. 6 identifies the current location 602 of the mobile device 100 by a graphical item that is a star and signifies a plurality of action spots 604, 608 by graphical items that are clouds. Additionally, the action spot 604 includes an activity icon that is a camera, which indicates at least one other mobile device is capturing pictures at the action spot 604.

FIG. 6 differs from FIGS. 3-5 in that a pop-up window 610 can be displayed proximate to the action spot 604 with the highest or most level of documenting activity. The pop-up window 610 can provide additional information relating to the documenting activity, such as the number of other mobile devices engaging in documenting activity at action spot 604, a summary describing the venue, landmark, or monument associated with action spot 604, the date and time of the most recent documenting action engaged by another mobile device, or any other additional information. In the particular implementation illustrated in FIG. 6, the pop-up window 610 displays the most recent captured photo that was posted on a virtual posting forum by another mobile device located at the action spot 608. In another implementation, the pop-up window 610 can display the most recent posting posted by another mobile device located at action spot 604.

In yet another implementation, the pop-up window 610 can provide directions to the action spot 604. In such an implementation, the directions can be provided in a pop-up window 610 to any of the action spots 604, 608 selected by the user of the mobile device 100. Alternatively, a user selectable option can be provided in the pop-up window 610 to launch an application that provides and displays navigational directions on the display 102 of the mobile device 100.

Figure 7:
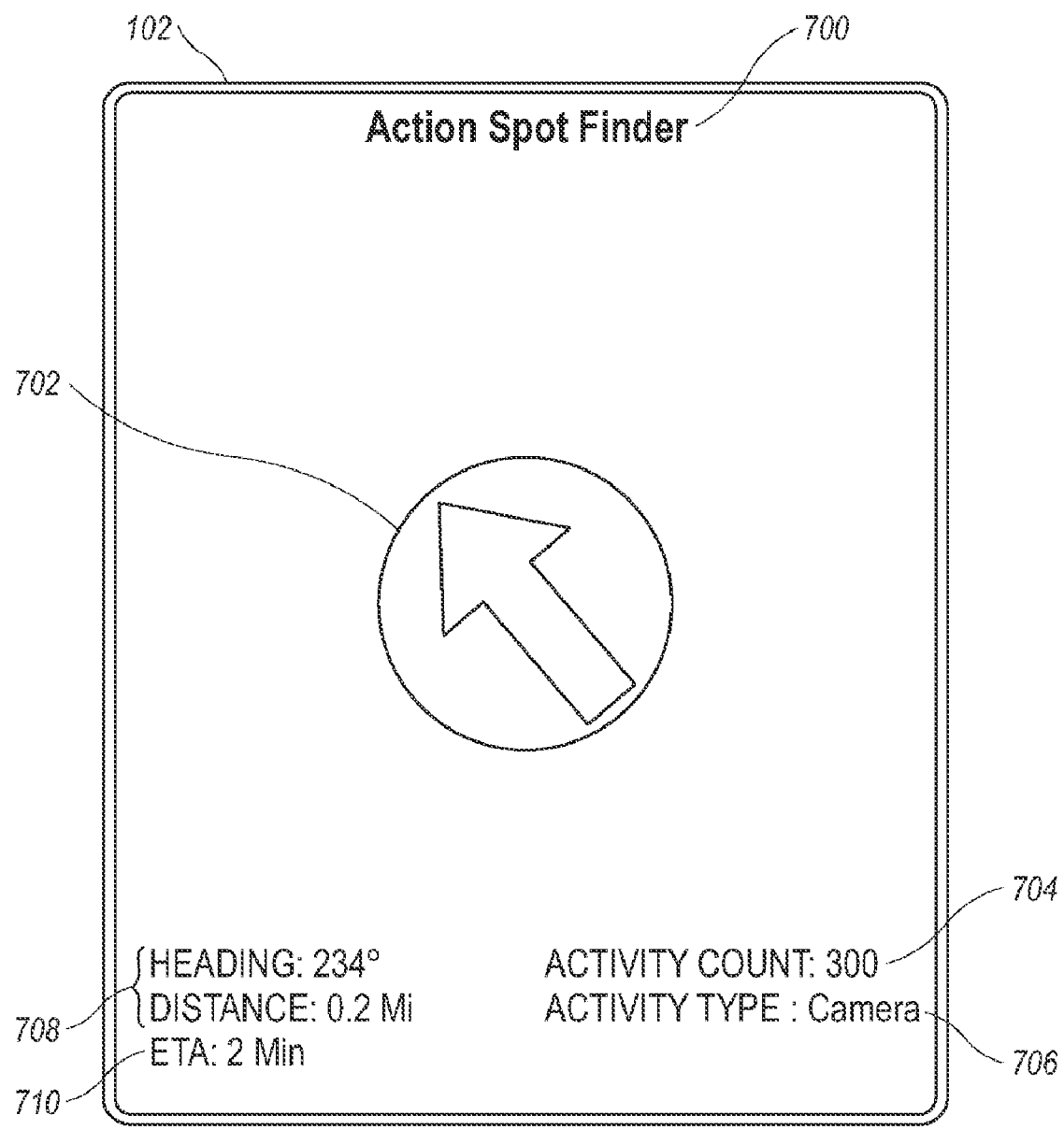
FIG. 7 is an illustrative implementation of a graphical user interface of a mobile device having a compass showing at least the distance and direction to an action spot proximate to the mobile device.

FIG. 7 illustrates an implementation of the present technology, where the system and method of determining action spots relative to the current location of the mobile device utilizes a compass 702 rather than a map. The specific implementation illustrated in FIG. 7 is a graphical user interface 700 displayed on the display 102 of a mobile device 100 when an application has been launched by the processor 110 (shown in FIG. 9) to find an action spot. When the processor 110 has determined the current location of the mobile device 100 and the action spots relative to the current location of the mobile device 100, instructions are executed by the processor 110 to point the compass 702 in the direction of the closest action spot proximate to the mobile device 100. In FIG. 7, the 702 compass is pointed in a northwest direction, indicating that if the user moves in the northwest direction, he or she will encounter an action spot.

The graphical user interface 700 illustrated in FIG. 7 can include additional information relating to the determined action spot, such as bearing and distance information 708, an estimated time of arrival 710 to the action spot, the level of activity 704 occurring at the action spot, the type of documenting action 706 engaged by other mobile devices at the action spot, or any other relevant information pertaining to the action spot. The bearing and distance information 708 provide the bearing and distance are provided in relation to the current location of the mobile device 100. For example, in FIG. 7, the nearest action spot to the current location of is located in a direction heading 234 degrees and 0.2 miles from the current location from the mobile device. The bearing and distance information 708 provide guidance to the user of the mobile device 100 towards an action spot within the vicinity of the current location of the mobile device 100.

The level of activity 704 can be a count of the number of photos or videos captured at the action spot to which the compass 702 points; the number of text messages, postings, email messages, instant messages, or other virtual and electronic messages sent from the action spot to which the compass 702 points; the number of other mobile devices engaging in documenting action at the action spot to which the compass 702 points; or any other number that is representative of the level of activity occurring at the action spot to which the compass 702 points. The type of documenting action 706 counted in the level of activity count 704 can be displayed below the level of activity 704. While FIG. 7 illustrates documenting action 706 that is capturing photographs with a camera of the mobile device, the documenting action 706 can also be identified as Messaging, Video Recording, Emailing, Twittering, or any other documenting action where a mobile device is being utilized to document and make note of a location or an event occurring at the location to which the compass 702 points.

The compass 702 and information 704, 706, 708, 710 relating to the action spot proximate to the current location of the mobile device 100 is dynamic and can be updated as the current location of the mobile device 100 changes. For example, as the mobile device 100 moves towards or away from an action spot, the direction displayed on the compass 702 can change. Additionally, the bearing and distance 708 and estimated time of arrival 710 to the action spot can also change accordingly. The activity count 704 and activity type 705 can also dynamically change to show the most current and up-to-date level of activity and type of activity occurring at the action spot to which the compass 702 points. For example, if more activity occurs from the first time the compass 702 locates the action spot and if the activity continues to increase as the mobile device 100 approaches the action spot, the activity count 704 can change to reflect the change in the level of activity. Similarly, the activity type 706 can change if the type of documenting action changes from the first time the compass 702 locates the action spot and as the mobile device 100 approaches the action spot.

In at least one implementation the graphical user interface 700 can include a background screen color to indicate the level of activity occurring at the action spot to which the compass 702 points. For example, if the background screen color is red, a high level of activity can be associated with the action spot. Alternatively, if the background color is blue, a low level of activity can be associated with the action spot. In another implementation, the background screen color can be indicative of the mobile device's 100 proximity to the action spot. For example, as the mobile device 100 travels towards the action spot to which the compass 702 points, the background screen color can change from green to red, indicating that the mobile device is close in proximity to the action spot. In at least one implementation, the background color can change from green to red, if the mobile device is within twenty-five feet from the action spot. In another implementation, the color of the compass 810 can change to indicate the mobile device's 100 proximity to the action spot.

Although FIG. 7 illustrates displaying the compass 702 at the center of the display screen without a map, one of ordinary skill in the art will appreciate that the compass 702 can be displayed on top of a map, superimposed on top of a map such that the compass is semi-transparent, displayed in a corner of the map, superimposed on a camera viewfinder displayed on the display 102 of the mobile device, or any other manner of displaying the compass 702 on the display screen 102 of the mobile device such that an action spot can be signified for identification to the user of the mobile device 100. In other implementations, the compass 702 can be the display of the cardinal or ordinal direction the mobile device 100 must travel to in order to arrive at the action spot, the display of an arrow or symbol representing the direction towards the action spot, or other graphical element representative of navigational instrument for determining direction towards an action spot proximate to the current location of the mobile device 100.

Figure 8:
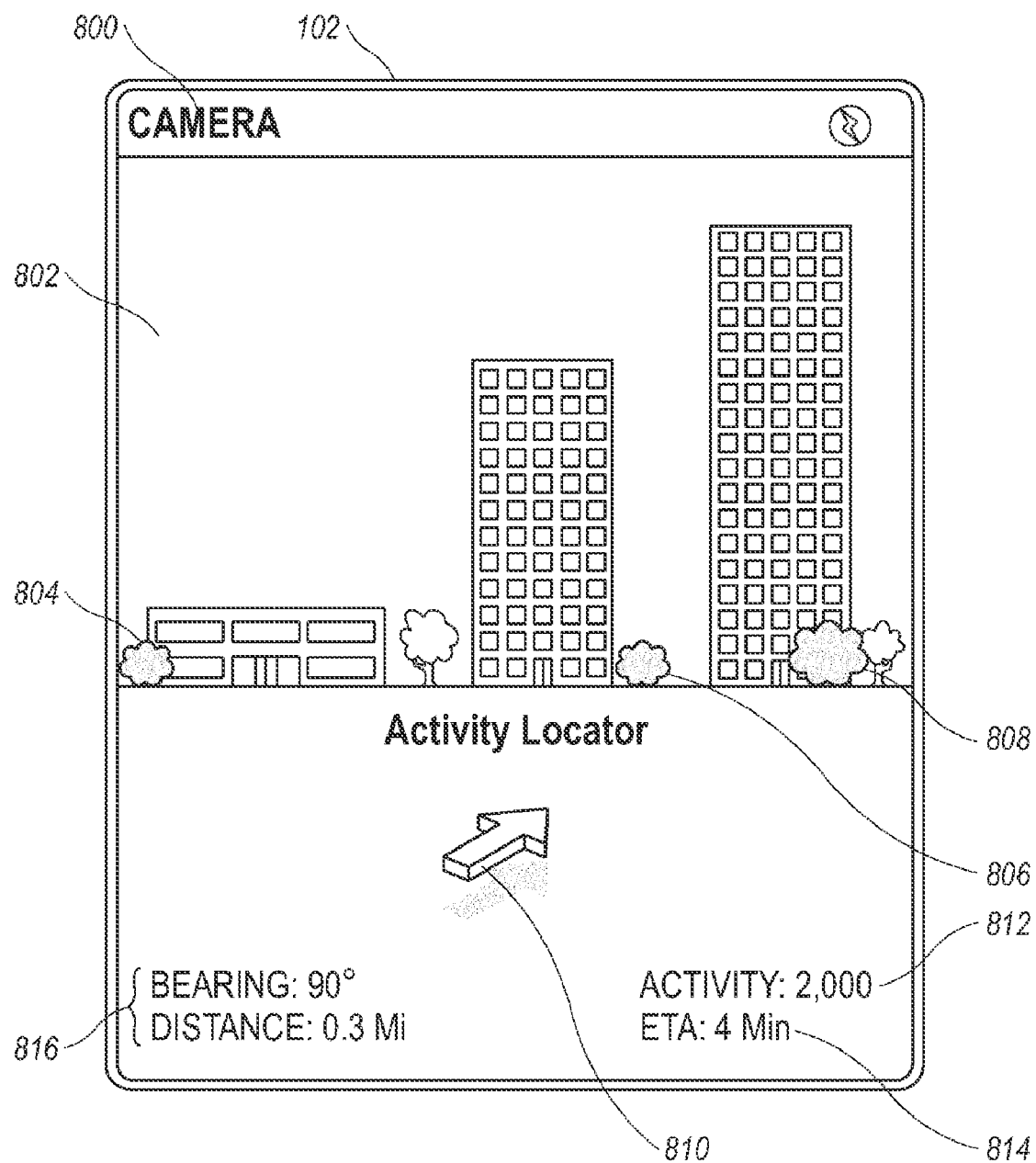
FIG. 8 is an illustrative implementation of a graphical user interface for determining action spots that utilizes a camera viewfinder of an integrated camera of the mobile device.

FIG. 8 illustrates an implementation of determining action spot relative to the location of a mobile device that utilizes the camera viewfinder of an integrated camera of the mobile device 100. FIG. 8 is a screenshot of the display 102 of a mobile device 100 in which a graphical user interface for an image acquisition application 800 such as a camera application is displayed. The viewfinder 802 displays an image from a camera module. For example, the viewfinder displays the landscape, cityscape, or locations captured by the lens of a camera of the mobile device 100. In FIG. 8, the viewfinder 802 displays a cityscape including building and greenery. When the camera application 800 is launched, a user-selectable option can be selected to instruct the processor 110 (shown in FIG. 9) of the mobile device 100 to locate action spots relative to the current location of the mobile device 100 displayed in the viewfinder 802. The action spots 804, 806, 808 can be superimposed on the viewfinder 802 signifying the locations of action spots 804, 806, 808 located within the vicinity shown in the viewfinder 802. In FIG. 8, the action spots 804, 806, 808 are superimposed proximate to buildings displayed in the viewfinder 802. The action spots 804, 806, 808 are signified by graphical items that are clouds, but can be any other graphical item as discussed herein. The graphical item associated with action spot 808 is larger than the graphical items associated with action spots 804 and 806, signifying that the activity level at action spot 808 is higher than the activity levels of action spots 804 and 806.

A compass 810 can be provided below the camera viewfinder to provide additional information and directions to the action spot 808 having the highest activity level. Similar to the compass 702 illustrated in FIG. 7, the compass 810 can display a direction pointer pointing towards the action spot 808 having the highest level of activity. Similar to the graphical user interface 700 illustrated in FIG. 7, the compass 810 can include additional information relating to the action spot 808 having the highest level of activity. For example, the additional information can include: the bearing and distance information 816, an estimated time of arrival 814 to the action spot 808, the level of activity 812 occurring at the action spot 808, the type of documenting action engaged by other mobile devices at the action spot 808, or any other relevant information pertaining to the action spot 808. Similar to FIG. 7, the compass 810, additional information 812, 814, 816, and the background screen color of the viewfinder 802, the background screen color of the compass 810 can change to indicate the proximity of the mobile device 100 to the action spot 804, 806, 808 as the mobile device 100 approaches the action spot 804, 806, 808.

While the implementation in FIG. 8 illustrates the compass 810 and additional information 812, 814, 816 below the viewfinder 200, the compass 810 and additional information 812, 814, 816 can be superimposed on the viewfinder, such that the compass 810 and additional information 812, 814, 816 are semi-transparent and the landscape or cityscape captured by the lens of the camera can still be identified on the viewfinder 802.

Figure 9:
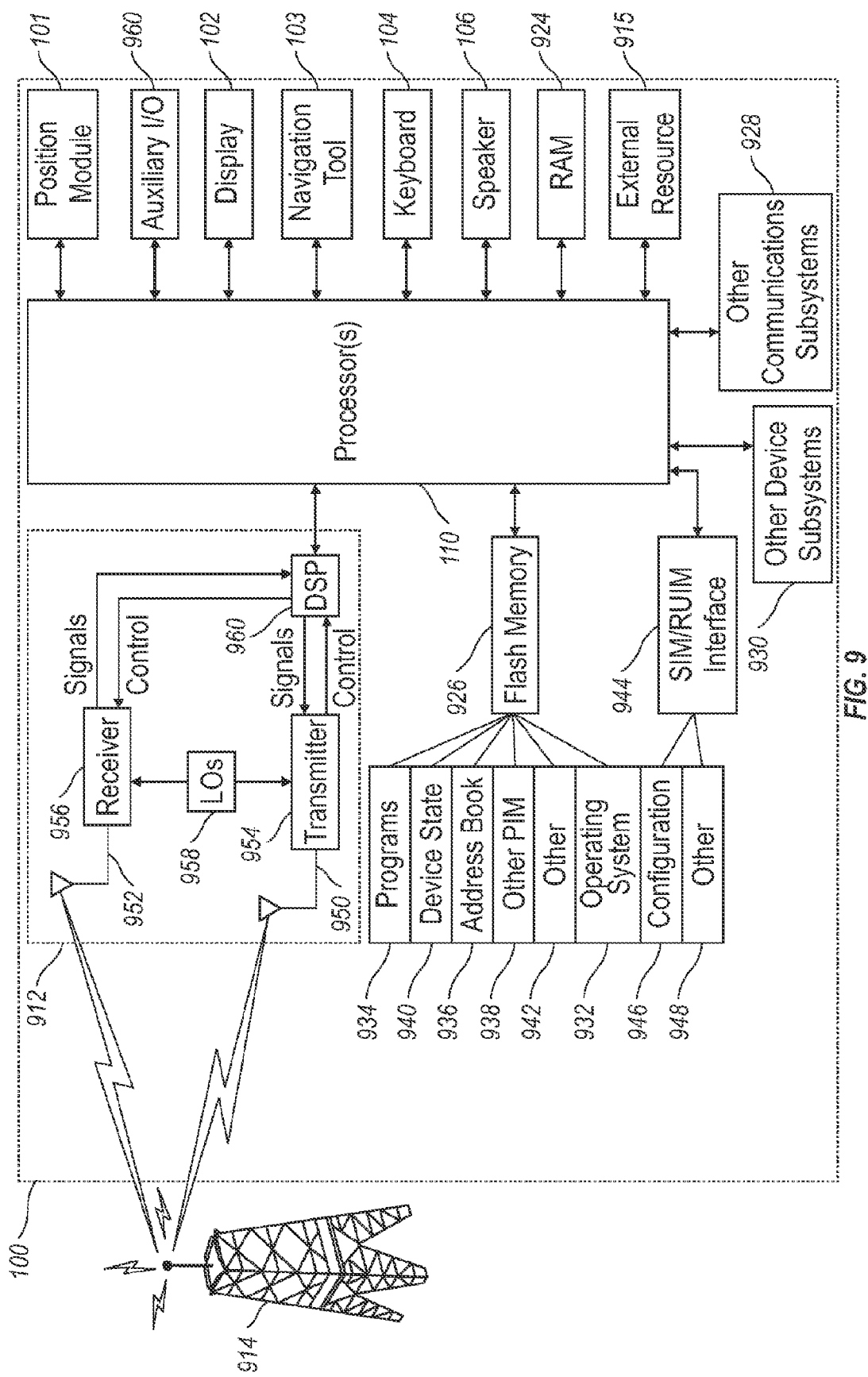
FIG. 9 is a block diagram representing a mobile device interacting in a communication network in accordance with an exemplary implementation of the present technology.

An exemplary implementation of a mobile device 100 configured to determine a location-based preferred media file using the system and method described herein, can include components as illustrated in FIG. 9. While the components of FIG. 9 are not all inclusive, FIG. 9 illustrates components that can be included on a mobile device 100 according to the present disclosure. Additional components are required to allow the mobile device 100 to function, but have been omitted for clarity.

As illustrated in FIG. 9, the mobile device 100 includes a communication subsystem 930 to perform all communication transmission and reception with a wireless network 914. A processor module 110 can be connected with an auxiliary input/output (I/O) subsystem 928 which can be coupled to the mobile device 100. The processor module 110 can include one or more processors. Additionally, the processors can be micro-processors for example. In at least one implementation, the processor module 110 can be coupled to a serial port (for example, a Universal Serial Bus port) which can allow for communication with other devices or systems. The display 110 can be coupled to the processor module 110 to allow for displaying of information to a user of the mobile device 100. When the mobile device 100 is equipped with a keyboard 104, the keyboard 104 can also be connected with the processor module 110. The mobile device 100 can include a speaker 106, a microphone, random access memory (RAM) 924, and flash memory 926, all of which can be coupled to the processor module 110. Other similar components can be provided on the mobile device 100 as well and optionally coupled to the processor module 110. Other communication subsystems 930 and other communication device subsystems 928 are generally indicated as being functionally connected with the processor module 110 as well. An example of the communication subsystem 912 is that of a short range communication system such as BLUETOOTH® communication module or a WI-FE) communication module (a communication module in compliance with IEEE 802.11 set of protocols) and associated circuits and components. The processor module 110 is able to perform operating system functions and enables execution of programs on the mobile device 100. In some implementations not all of the above components can be included in the mobile device 100.

The auxiliary I/O subsystem 960 can take the form of a trackpad navigation tool, or a trackball, a thumbwheel, a navigation pad, a joystick, touch-sensitive interface, or other I/O interface. While the above examples have been provided in relation to the auxiliary I/O subsystem 960, other subsystems capable of providing input or receiving output from the mobile device 100 are considered within the scope of this disclosure. Other keys can be placed along the side of the mobile device 100 to function as escape keys, volume control keys, scrolling keys, power switches, or user programmable keys, and can likewise be programmed accordingly.

Furthermore, the mobile device 100 is equipped with components to enable operation of various programs, as shown in FIG. 9. For example, such a program can be a computer application programmed to determine location-based preferred media files or to retrieve directions and maps associated with the current position of the mobile device 100. In an exemplary implementation, the flash memory 926 is enabled to provide a storage location for the operating system 932, device programs 934, and data. The operating system 932 is generally configured to manage other programs 942 that are also stored in memory 926 and executable on the processor 110. The operating system 932 honors requests for services made by programs 934 through predefined program 934 interfaces. More specifically, the operating system 926 typically determines the order in which multiple programs 934 are executed on the processor 110 and the execution time allotted for each program 934, manages the sharing of memory 926 among multiple programs 934, handles input and output to and from other device subsystems 930, and so on. In addition, users can typically interact directly with the operating system 932 through a user interface which can include the keyboard 104 and display screen 110. While in an exemplary implementation the operating system 932 is stored in flash memory 926, the operating system 932 in other implementations is stored in read-only memory (ROM) or similar storage element (not shown). As those skilled in the art will appreciate, the operating system 932, device program 934 or parts thereof can be loaded in RAM 924 or other volatile memory.

In one exemplary implementation, the flash memory 926 contains programs 934 for execution on the mobile device 100 including an address book 936, a personal information manager (PIM) 938, and the device state 940. Furthermore, programs 934 and other information 948 including data can be segregated upon storage in the flash memory 926 of the mobile device 100.

When the mobile device 100 is enabled for two-way communication within the wireless communication network 914, the mobile device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 914. Other systems may not require such identifying information. GPRS, UMTS, and EDGE use a Subscriber Identity Module (SIM) in order to allow communication with the communication network 914. Likewise, most CDMA systems use a Removable User Identity Module (RUIM) in order to communicate with the CDMA network. The RUIM and SIM card can be used in multiple different mobile devices 100. The mobile device 100 can be able to operate some features without a SIM/RUIM card, but the mobile device will not be able to communicate with the network 914. A SIM/RUIM interface 944 located within the mobile device 100 allows for removal or insertion of a SIM/RUIM card (not shown). The SIM/RUIM card features memory and holds key configurations 946, and other information 948 such as identification and subscriber related information. With a properly enabled mobile device 100, two-way communication between the mobile device 100 and communication network 914 is possible.

If the mobile device 100 is enabled as described above or the communication network 914 does not require such enablement, the two-way communication enabled mobile device 100 is able to both transmit and receive information from the communication network 914. The transfer of communication can be from the mobile device 100 or to the mobile device 100. In order to communicate with the communication network 914, the mobile device 100 in the presently described exemplary implementation is equipped with an integral or internal antenna 950 for transmitting messages to the communication network 914. Likewise the mobile device 100 in the presently described exemplary implementation is equipped with another antenna 952 for receiving communication from the communication network 914. These antennae (952, 950 in another exemplary implementation are combined into a single antenna (not shown). As one skilled in the art would appreciate, the antenna or antennae (952, 950) in another implementation are externally mounted on the mobile device 100.

When equipped for two-way communication, the mobile device 100 features the communication subsystem 912. As is understood in the art, the communication subsystem 912 is modified so that the subsystem 912 can support the operational needs of the mobile device 100. The subsystem 912 includes a transmitter 954 and receiver 956 including the associated antenna or antennae (952, 950) as described above, local oscillators (LOs) 958, and a processing module which in the presently described exemplary implementation is a digital signal processor (DSP) 960.

The present disclosure contemplates that communication by the mobile device 100 with the wireless network 914 can be any type of communication that both the wireless network 914 and mobile device 100 are enabled to transmit, receive and process. In general, these can be classified as voice and data. Voice communication generally refers to communication in which messages for audible sounds are transmitted by the mobile device 100 through the communication network 914. Data generally refers to all other types of communication that the mobile device 100 is capable of performing within the constraints of the wireless network 914.

Example device programs that can depend on such data include email, contacts and calendars. For each such program, synchronization with home-based versions of the programs can be desirable for either or both of the program's long term and short term utility. As an example, emails are often time sensitive, so substantially real time synchronization can be desired. Contacts, on the other hand, can be usually updated less frequently without inconvenience. Therefore, the utility of the mobile device 100 is enhanced when connectable within a communication system, and when connectable on a wireless basis in the network 914 in which voice, text messaging, and other data transfer are accommodated.

Even more, the present technology can take the form of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Those of skill in the art will appreciate that other implementations of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Implementations may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk, an optical disk, and non-transitory memory. Current examples of optical disks include compact disk-read only memory (CD-ROM), compact disk-read/write (CD-R/W), DVD, and Blu Ray™.

Implementations within the scope of the present disclosure may also include tangible and/or non-transitory computer-readable storage media for carrying or having computer-executable instructions or data structures stored thereon. Additionally, non-transitory memory also can store programs, device state, various user information, one or more operating systems, device configuration data, and other data that may need to be accessed persistently. Further, non-transitory computer-readable storage media expressly exclude media such as energy, carrier signals, electromagnetic waves, and signals per se. Such non-transitory computer-readable storage media can be any available media that can be accessed by a general purpose or special purpose computer, including the functional design of any special purpose processor as discussed above. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Both processors and program code for implementing each medium as an aspect of the technology can be centralized or distributed (or a combination thereof) as known to those skilled in the art.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, Wi-Fi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

Exemplary implementations have been described hereinabove regarding a system and method for determining action spots relative to the location of a mobile device. With the system and method for determining a location-based preferred media file, information relating to the popularity of venues and current happenings occurring within the vicinity surrounding or associated with the current location of mobile devices is readily available to the mobile device without having use an external device or a manual search engine, such as an internet search engine. Additionally, the present disclosure enables review of relevant information in regards to the current location of the mobile device in the form of an action spot. The presentation of the action spots allows a user to receive limited relevant information. Also, when presented with multiple action spots in proximity to the current location of the mobile device, the present disclosure enables a more complete review of the surrounding vicinity. Additionally, when presented with a compass, enhanced information and directions can be presented to the user of the mobile device to guide the user to action spots proximate to the current location of the user's mobile device.

One of ordinary skill in the art will appreciate that the features in each of the figures described herein can be combined with one another and arranged to achieve the described benefits of the presently disclosed system and method for determining action spots relative to the location of a mobile device. Additionally, one of ordinary skill will appreciate that the elements and features from the illustrated implementations herein can be optionally included to achieve the described benefits of the presently disclosed system and method for determining action spots relative to the location of a mobile device. Various modifications to and departures from the disclosed implementations will occur to those having skill in the art.

The invention claimed is:

1. A mobile device comprising:
   a display; and
   a processor module communicatively coupled to the display and configured to receive executable instructions to:
      display a graphical user interface on the display;
      receive data indicative of a current location of the mobile device;
      determine at least one action spot within a predetermined distance from the current location of the mobile device, the at least one action spot corresponding to a location where at least one other mobile device has engaged in documenting action within a predetermined period of time;
      signify the at least one action spot on the graphical user interface; and
      provide an indication of activity level at the at least one action spot.

2. The mobile device as recited in claim 1, wherein the indication of activity level includes coloring a graphical item associated with the at least one action spot in accordance with a range of activity occurring at the at least one action spot.

3. The mobile device as recited in claim 1, wherein the level of activity is based upon at least one of a number of images being captured, a number of videos being captured, or a number of messages being transmitted within a predetermined distance from the at least one action spot.

4. The mobile device as recited in claim 1, wherein the processor module is further configured to receive instructions to provide directions to the at least one action spot in response to a selection of a graphical item associated with the at least one action spot.

5. The mobile device as recited in claim 4, wherein the providing directions presents a graphical interface on a display of the mobile device in the form of a map.

6. The mobile device as recited in claim 1, wherein the graphical user interface includes displaying a compass on a display of the mobile device.

7. The mobile device as recited in claim 6, wherein the compass provides bearing and distance to the at least one activity spot.

8. The mobile device as recited in claim 1, wherein the determining of the at least one action spot is based upon a defined distance from the mobile device.

9. The mobile device as recited in claim 1, wherein the processor module is further configured to receive executable instructions to:
   run an image acquisition application on the mobile device;
   display an image from a camera module on the display screen; and
   display the image with the at least one activity spot.

10. A method for providing action spots on a mobile device comprising:
    determining, via a processor, a current location of the mobile device;
    determining at least one action spot within a predetermined distance from the current location of the mobile device, the at least one action spot corresponding to a location where at least one other mobile device has engaged in documenting action within a predetermined period of time;
    displaying a graphical item on the display of the mobile device, said graphical item identifying a direction, relative to the current location, in which to travel in order to arrive at the determined at least one action spot.

11. The method of claim 10, wherein a level of activity associated with the at least one action spot is signified on the display of the mobile device.

12. The method of claim 10, wherein the level of activity associated with the at least one action spot is signified by coloring the background of the display according to a color scheme associated with a range of activity occurring at the at least one action spot.

13. A method for providing action spots on a mobile device comprising:
    determining, via a processor, a current location of the mobile device;
    determining at least one action spot within a predetermined distance from the current location of the mobile device, the at least one action spot corresponding to a location where at least one other mobile device has engaged in documenting action within a predetermined period of time;
    signifying the at least one action spot with a graphical item on a display of the mobile device;
    marking the graphical item according to an activity level with at least one action spot.

14. The method as recited in claim 13, wherein marking the graphical item includes coloring the graphical item in accordance with a range of activity occurring at the at least one action spot.

15. The method as recited in claim 13, wherein the activity level is based upon at least one of a number of images being captured, a number of videos being captured, or a number of messages being transmitted within a predetermined distance from the at the at least one action spot.

16. The method as recited in claim 13, further comprising providing directions to the at least one action spot in response to a selection of the graphical item on the display of the mobile device.

17. The method as recited in claim 16, wherein providing directions presents a graphical interface on the display of the mobile device in the form of a map.

18. The method as recited in claim 17, wherein the graphical interface further includes a compass on a display of the mobile device.

19. The method as recited in claim 18, wherein the compass provides bearing and distance to the at least one activity spot.

20. The method as recited in claim 13, further comprising:
    running an image acquisition application on the mobile device;
    displaying an image from a camera module on the display; and
    displaying the image with the at least one activity spot.

* * * * *